(12) United States Patent
Stein et al.

(10) Patent No.: US 10,094,429 B1
(45) Date of Patent: Oct. 9, 2018

(54) LIMITING ASSEMBLY FOR A SELF-ADJUSTING HEAVY DUTY CLUTCH

(71) Applicant: Illinois Auto Truck Co., Inc., Des Plaines, IL (US)

(72) Inventors: Richard H. Stein, Des Plaines, IL (US); Jordan R. Stein, Des Plaines, IL (US); Cory Anta, Des Plaines, IL (US); Steve Saaf, Des Plaines, IL (US); Vadim Tikhonov, Des Plaines, IL (US)

(73) Assignee: ILLINOIS AUTO TRUCK CO., INC., Des Plaines, IL (US)

( * ) Notice: Subject to any disclaimer, the term of this patent is extended or adjusted under 35 U.S.C. 154(b) by 0 days.

(21) Appl. No.: 15/378,748

(22) Filed: Dec. 14, 2016

Related U.S. Application Data

(60) Provisional application No. 62/267,040, filed on Dec. 14, 2015.

(51) Int. Cl.
    *F16D 13/75*     (2006.01)

(52) U.S. Cl.
    CPC ................ *F16D 13/757* (2013.01)

(58) Field of Classification Search
    CPC .............. F16D 13/757; F16D 13/75
    See application file for complete search history.

(56) References Cited

U.S. PATENT DOCUMENTS

| | | | |
|---|---|---|---|
| 3,394,788 A | 7/1968 | Sink | |
| 3,752,286 A | 8/1973 | Sink | |
| 3,791,499 A | 2/1974 | Ryan | |
| 4,207,972 A | 6/1980 | Zeidler | |
| RE34,105 E | 10/1992 | Flotow et al. | |
| 5,238,093 A | 8/1993 | Campbell | |
| 5,320,205 A | 6/1994 | Kummer et al. | |
| 5,456,345 A | 10/1995 | Bissett | |
| 5,531,308 A | 7/1996 | Gochenour et al. | |
| 5,564,541 A | 10/1996 | Gochenour et al. | |
| 5,564,542 A | 10/1996 | Gochenour et al. | |
| 5,566,804 A | 10/1996 | Gochenour et al. | |
| 5,695,036 A | 12/1997 | Gochenour et al. | |
| 5,791,448 A | 8/1998 | Gochenour et al. | |
| 5,904,233 A * | 5/1999 | Hashimoto | F16D 13/757 192/111.19 |

(Continued)

FOREIGN PATENT DOCUMENTS

DE      4412107 A1      11/1994

OTHER PUBLICATIONS

English Machine Translation of German Publication No. DE4412107 (Fichtel & Sachs AG), Published Nov. 3 1994.

*Primary Examiner* — Jacob S. Scott
*Assistant Examiner* — Timothy Hannon
(74) *Attorney, Agent, or Firm* — Patzik, Frank & Samotny Ltd.

(57) ABSTRACT

A limiting mechanism or assembly for a self-adjusting friction clutch to prevent the overadjustment of cam rings caused by a sudden impact to the vehicle. The limiting mechanism connects the cover to the adjustment mechanism using straps that link fixation members together. In one embodiment, a first fixation member comprises a bolt that attaches a bushing, which is placed through a corresponding hole in the cover of the clutch, relative to the pressure plate and a second fixation member comprises a bolt that engages a corresponding hole on the adjusting ring.

12 Claims, 10 Drawing Sheets

(56) References Cited

U.S. PATENT DOCUMENTS

| | | | |
|---|---|---|---|
| 5,934,429 | A | 8/1999 | Jennings |
| 6,062,365 | A | 5/2000 | Gochenour |
| 6,098,773 | A | 8/2000 | Blessinger et al. |
| 6,102,181 | A | 8/2000 | Lepard et al. |
| 6,109,412 | A | 8/2000 | Cole et al. |
| 6,264,019 | B1 | 7/2001 | Uehara |
| 6,267,215 | B1 | 7/2001 | Bader et al. |
| 6,325,193 | B1 | 12/2001 | Gochenour |
| 6,533,094 | B2 | 3/2003 | Uehara et al. |
| 6,571,923 | B2 | 6/2003 | Kummer |
| 6,974,013 | B1 | 12/2005 | Catrinta |
| 7,712,595 | B2 | 5/2010 | McCutcheon et al. |
| 8,074,780 | B2 | 12/2011 | Mehta et al. |
| 8,443,954 | B2 | 5/2013 | Quehenberger et al. |
| 9,151,337 | B2 | 10/2015 | Ley |
| 2010/0133056 | A1* | 6/2010 | McCutcheon ........ F16D 13/385 192/70.251 |

* cited by examiner

LIMITING ASSEMBLY FOR A SELF-ADJUSTING HEAVY DUTY CLUTCH

RELATED APPLICATION

This application claims the benefit of U.S. provisional patent application Ser. No. 62/267,040, filed Dec. 14, 2015, the entirety of which is hereby incorporated by reference.

FIELD OF THE INVENTION

This invention relates generally to self-adjusting friction clutches and, more particularly, to self-adjusting friction clutches that have a limiting mechanism or assembly to prevent unintended over adjustments of the clutches.

BACKGROUND OF THE INVENTION

Clutches engage and disengage two moving parts relative to one another. In vehicles, clutches are used to change gears to control the amount of power that is transferred from the vehicle's engine to the transmission to make the vehicle move. In particular, a pressure plate removably engages a drive member attached to a clutch flywheel connected to the engine crankshaft. Disengagement of the clutch by depressing the clutch pedal releases the pressure plate from contact with the drive member to allow the gears to be changed in the vehicle.

Over time, components of clutches wear down from constant engagement and disengagement during use. In order to allow the clutch to effectively work, the components of the clutch need to be adjusted to ensure that the pressure plate remains in frictional contact relative to the flywheel when the clutch is not engaged.

Heretofore, it has been known to use manual and self-adjusting clutches to accommodate for the wear in the driven member to increase the life and effectiveness of the clutch. A self-adjusting clutch is intended to make the internal adjustment automatically as the components wear and thus reduce the maintenance, and thus downtime and related expenses, for the vehicle.

One form of a self-adjusting clutch comprises a pair of opposing cam rings having a plurality of corresponding ramps with serrations thereon, wherein the ramps of the cam rings and their serrations engage each other when the clutch is engaged to lock the internal components of the clutch in place relative to one another. After a period of use, wear on the friction surface of the driven member causes the distance between the pressure plate and driven member to increase. The additional distance causes one of the cam rings to rotate relative to the other cam ring when the clutch is not engaged to compensate for wear on the friction surface of the driven member of the clutch. Examples of self-adjusting clutches includes those disclosed in U.S. Pat. No. 5,566,804, the entirety of which is hereby incorporated by reference.

While such self-adjusting clutches work, problems have arisen during their use and operation in the field. In particular, it has been known for the cam rings to jump when there is a sudden impact to a vehicle (e.g., when a truck hits a loading dock when backing up), thereby causing an over-adjustment of the cam rings due to the increased distance caused by the impact. The overadjustment shortens the life of the clutch and diminishes its value.

BRIEF SUMMARY OF THE INVENTION

The present invention comprises a limiting mechanism or assembly for a self-adjusting friction clutch to prevent the overadjustment of the cam rings caused by a sudden impact to the vehicle. The limiting mechanism connects the pressure plate to the adjustment mechanism using straps that link fixation members together. One fixation member comprises a bolt that attaches a bushing, which is placed through a corresponding hole in the cover of the clutch, relative to the pressure plate. The head of bolt is sized to extend over the end of the bushing to limit movement therein. The other end of the bolt may be screwed into a corresponding hole on the pressure plate. The bushing includes a groove or slot on its lower end that is sized for receiving one end of the strap or connecting member. The other end of the strap includes an opening that is sized to allow a second fixation member such as a bolt to extend therethrough to engage a corresponding hole on the adjusting ring. In order to facilitate the placement of the strap onto the bushing, the strap may include an oversized hole or opening that allows the bushing to be placed in a larger portion of the opening and then slid to engage the groove or slot. Using the limiting mechanism to connect the pressure plate to the cam ring prevents the cam ring from jumping and over-adjusting when a sudden jolt of shock load is introduced into the clutch assembly (e.g., when the vehicle hits a solid object such as backing into a loading dock).

Accordingly, it is an object of the present invention to provide a self-adjusting friction clutch that is economical and easy to manufacture and use.

It is another object of the present invention to provide a self-adjusting friction clutch that inhibits unintended adjustment of the cam rings.

It is yet another object of the present invention to provide a self-adjusting friction clutch that minimizes clutch maintenance and maximizes vehicle operation time.

It is yet another object of the present invention to provide a self-adjusting friction clutch that maintains constant adjustment of the clutch.

Other objects, features and advantages of the invention will be apparent from the following detailed disclosure, taken in conjunction with the accompanying sheets of drawings, wherein like reference numerals refer to like parts.

DETAILED DESCRIPTION OF THE INVENTION

Figure 1:
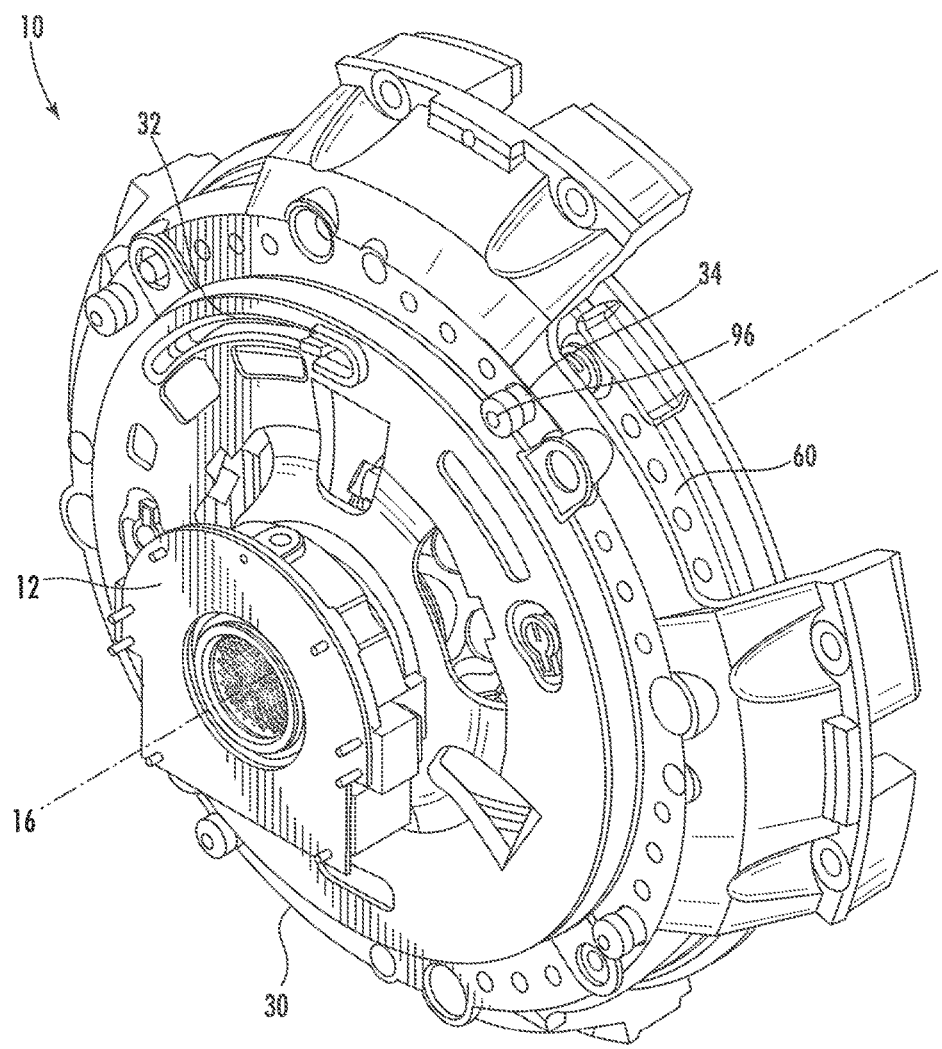
FIG. 1 is a perspective view of components of a heavy duty clutch with a release assembly showing use of one embodiment of the limiting mechanisms of the present invention.

While this invention is susceptible of embodiment in many different forms, there is shown in the drawings and will herein be described in detail several specific embodiments, with the understanding that the present disclosure is to be considered merely an exemplification of the principles of the invention and the application is limited only to the appended claims.

It is appreciated that the limiting mechanism of the present invention may be used with a variety of self-adjusting clutch assemblies utilizing cam rings to prevent the cam rings from over-adjusting upon a sudden impact including, but not limited to, the clutch assemblies shown and disclosed in U.S. Pat. No. 5,566,804, the entirety of which is hereby incorporated by reference.

Clutch assembly 10 is designed to selectively transmit torque from a vehicle's engine to a driven shaft. In particular, a release assembly 12 allows for the clutch assembly to be selectively disengaged from the flywheel (typically through engagement or pressing of a clutch pedal within the vehicle). Releasing the clutch assembly 10 allows for gears to be shifted on the vehicle in connection with a change in the speed or direction of the vehicle or load on the engine (e.g., going up a steep hill).

Figure 2:
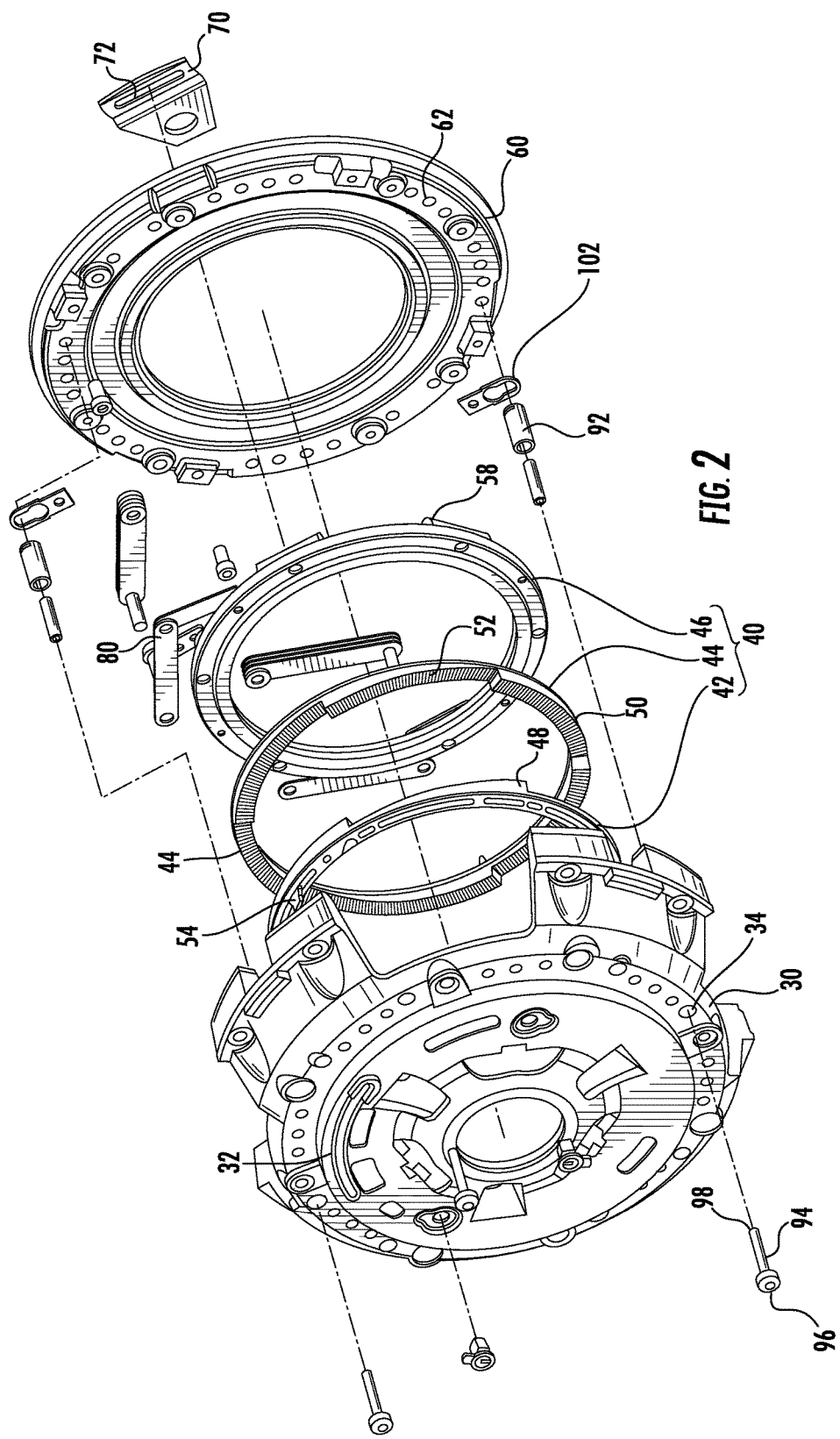
FIG. 2 is an exploded view of the heavy duty clutch of FIG. 1.

FIGS. 1 and 2 illustrate components of one embodiment of a clutch assembly 10 that the limiting mechanisms 90 of the present invention may be utilized with. In particular, the clutch assembly 10 generally includes: a clutch cover 30; an adjustment mechanism 40 comprising a pair of cam rings 42, 44, and an adjusting ring 46; and a pressure plate 60. It is appreciated that other embodiment of self-adjusting friction clutches may be used with the limiting mechanism 90 of the present invention.

Cover 30 is shaped to fit over the pressure plate 60 and adjustment mechanism 40 and is fixed relative to the flywheel (not shown) to allow the cover 30 and flywheel to rotate together about axis 16. Pressure plate 60 and a driven member (not shown) are positioned between the cover 30 and the flywheel, with the driven member rotationally connected to the driven shaft. In operation, the friction surface of the driven member engages a friction surface of the pressure plate 60 to prevent rotational movement thereof to transmit torque to the driven shaft. Disengagement of the clutch by depressing the clutch pedal disengages the pressure plate 60 from the driven member.

Repeated engaging and disengaging of the clutch wear down the friction surface, which creates a larger gap between the pressure plate and driven member that could affect the operation of the vehicle if the clutch is not adjusted to accommodate the wear in the friction surface. Adjustment may be done automatically such as by using as adjustment mechanism such as that shown by reference numeral 40, which includes cam rings 42, 44 and adjusting ring 46.

Adjusting ring 46 and the second cam ring 44 are attached or otherwise connected to one another and to pressure plate 60. The first cam ring 42 includes a plurality of annular ramps 48 and the second cam ring 44 includes a plurality of annular ramps 50 that correspond with the annular ramps 48 of the first cam ring 42. The ramps may include corresponding serrations 52 that engage each other when the clutch is engaged to lock the internal components of the clutch in place relative to one another. A spring assembly 45 acts on the second cam ring 44 to rotate the second cam ring 44 when adjustment is needed due to the wear in the friction member. An indicator tab 54 on the second cam ring 44 is viewable through one or more corresponding slots or openings 32 in the cover 30 to present a visual indication of the amount of adjustment left to be made in the clutch without having to take the clutch apart to determine whether to replace the clutch.

Figure 3:
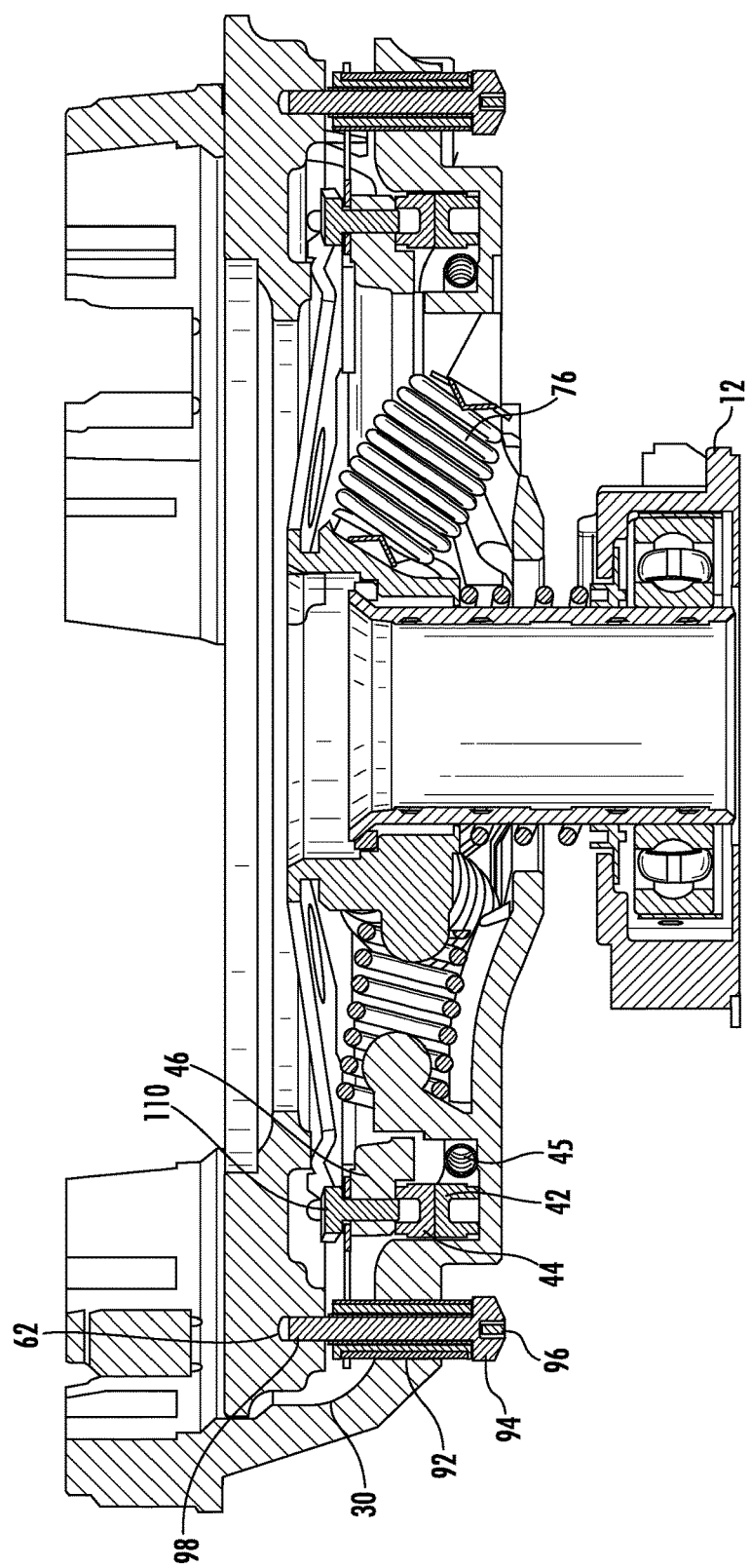
FIG. 3 is a cross sectional view of the heavy duty clutch of FIG. 1.
Figure 4:
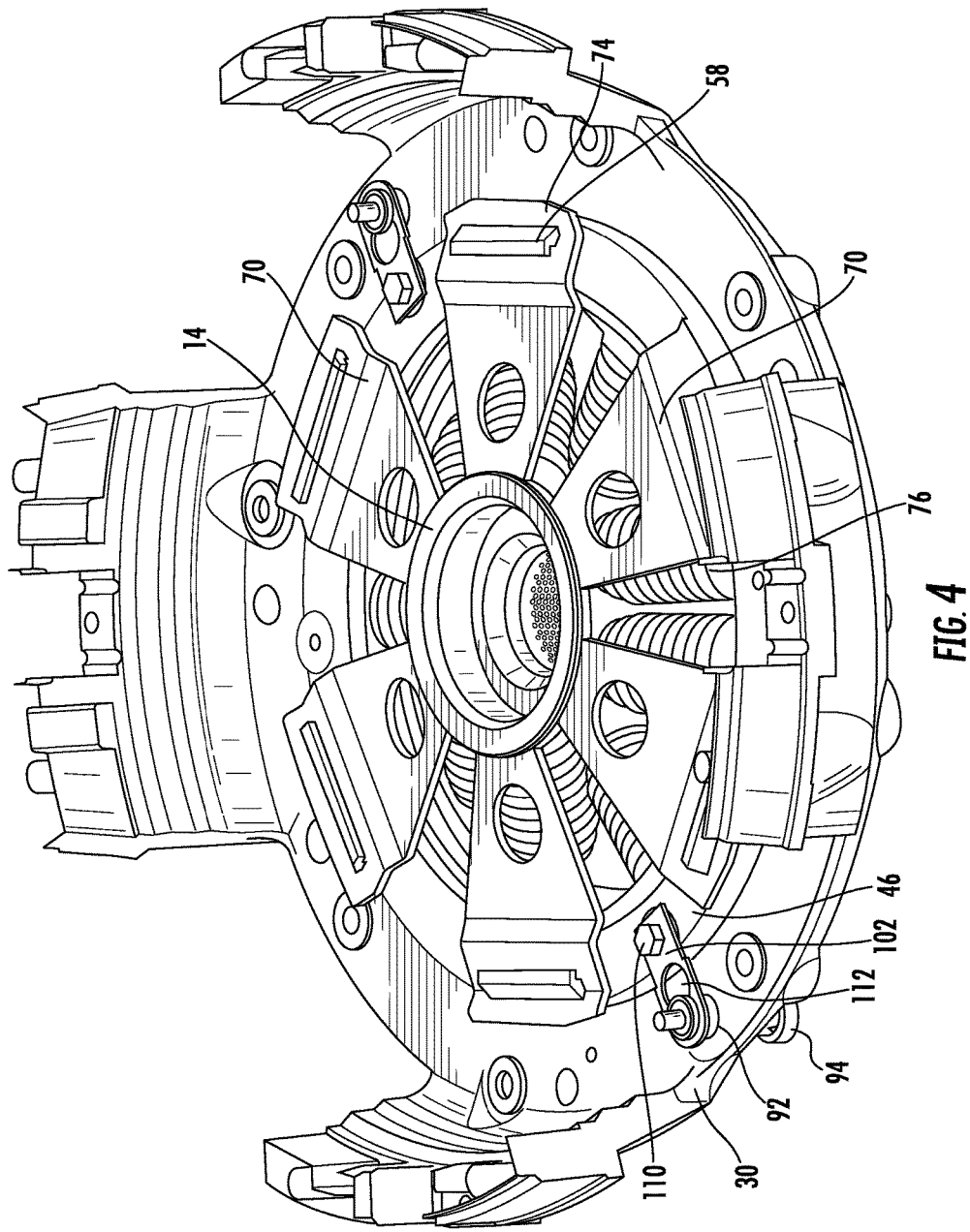
FIGS. 4 and 5 are perspective views of a cover of a heavy duty clutch showing use of limiting mechanisms of the present invention.
Figure 5:
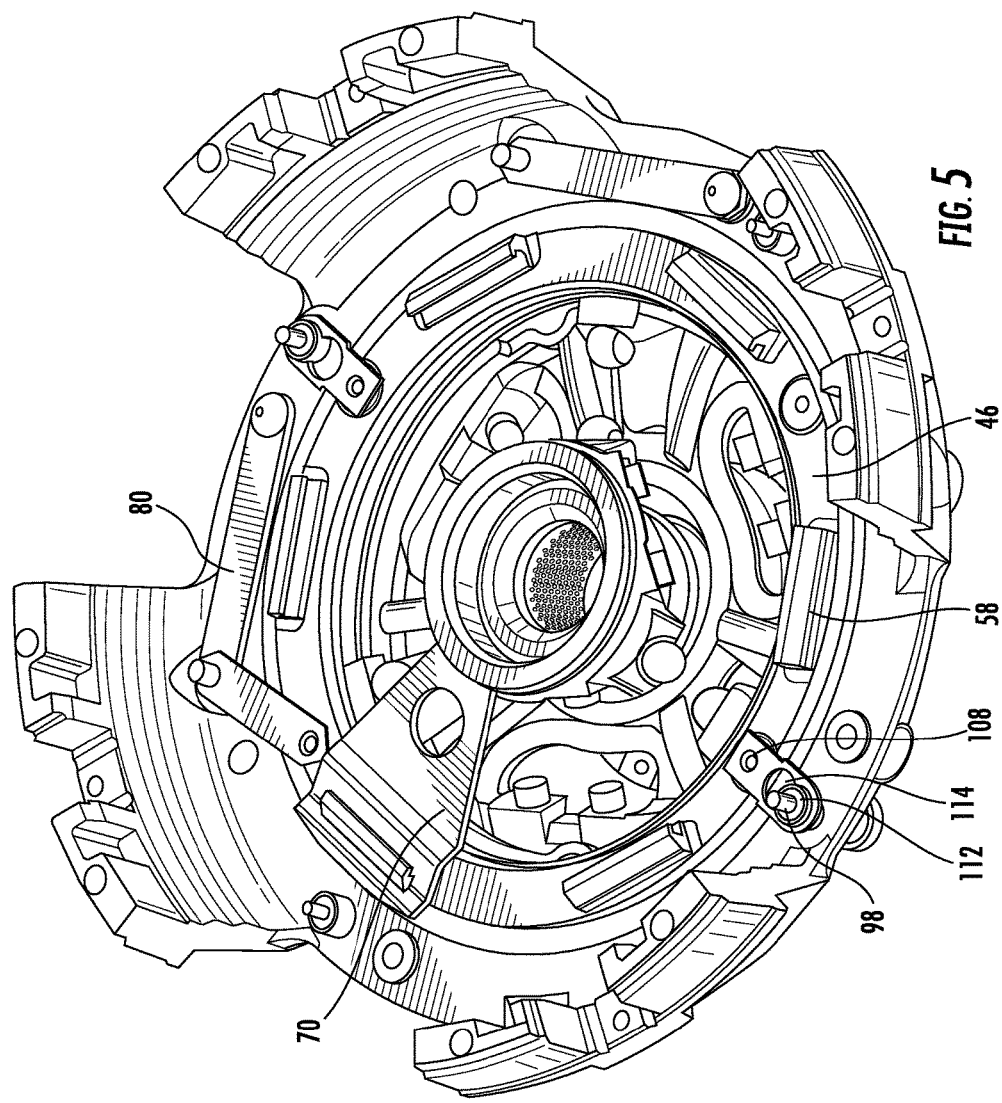
Figure 6:
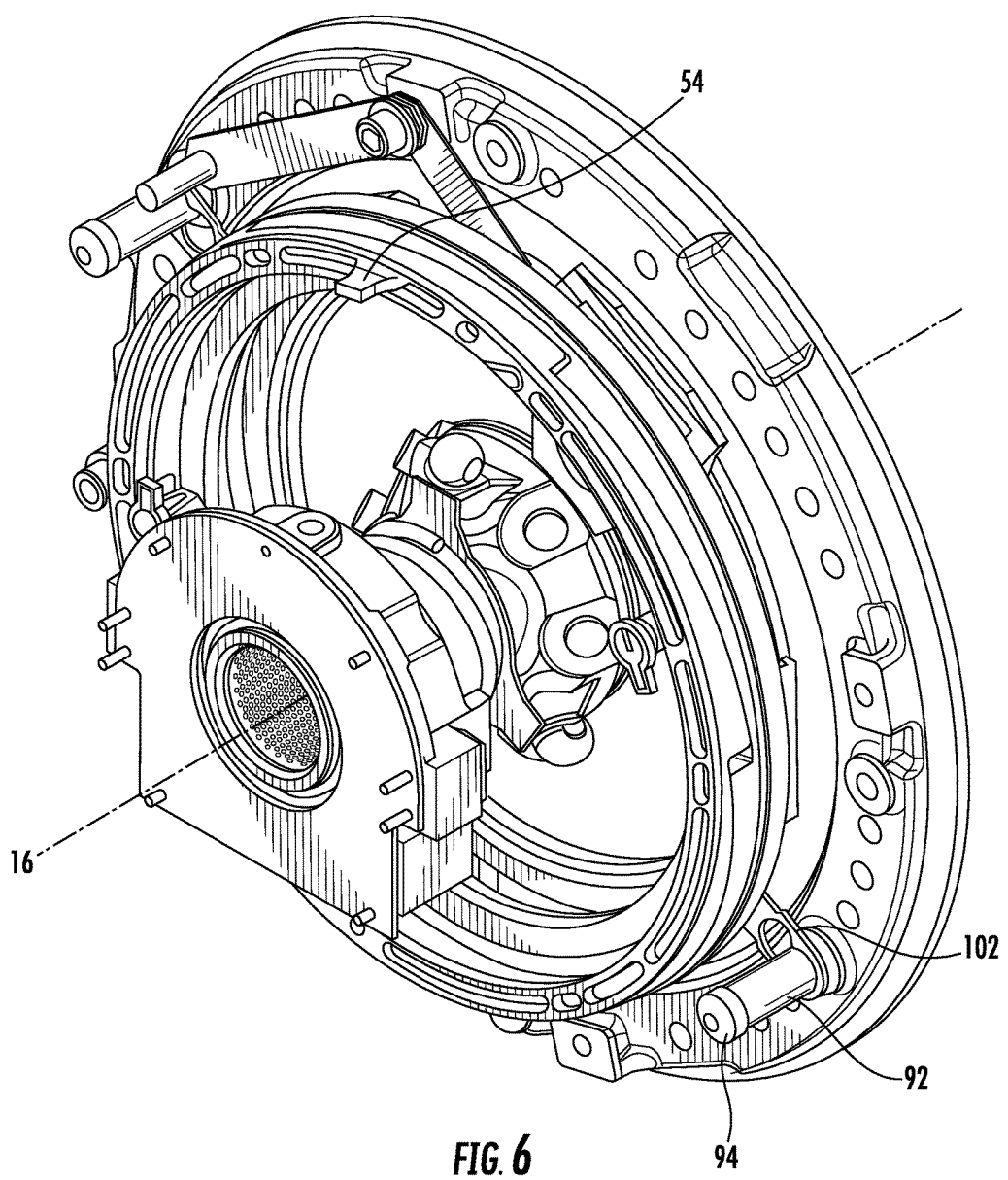
FIG. 6 is a perspective view of a pressure plate and release assembly of a heavy duty clutch showing use of the limiting mechanisms of the present invention.
Figure 7:
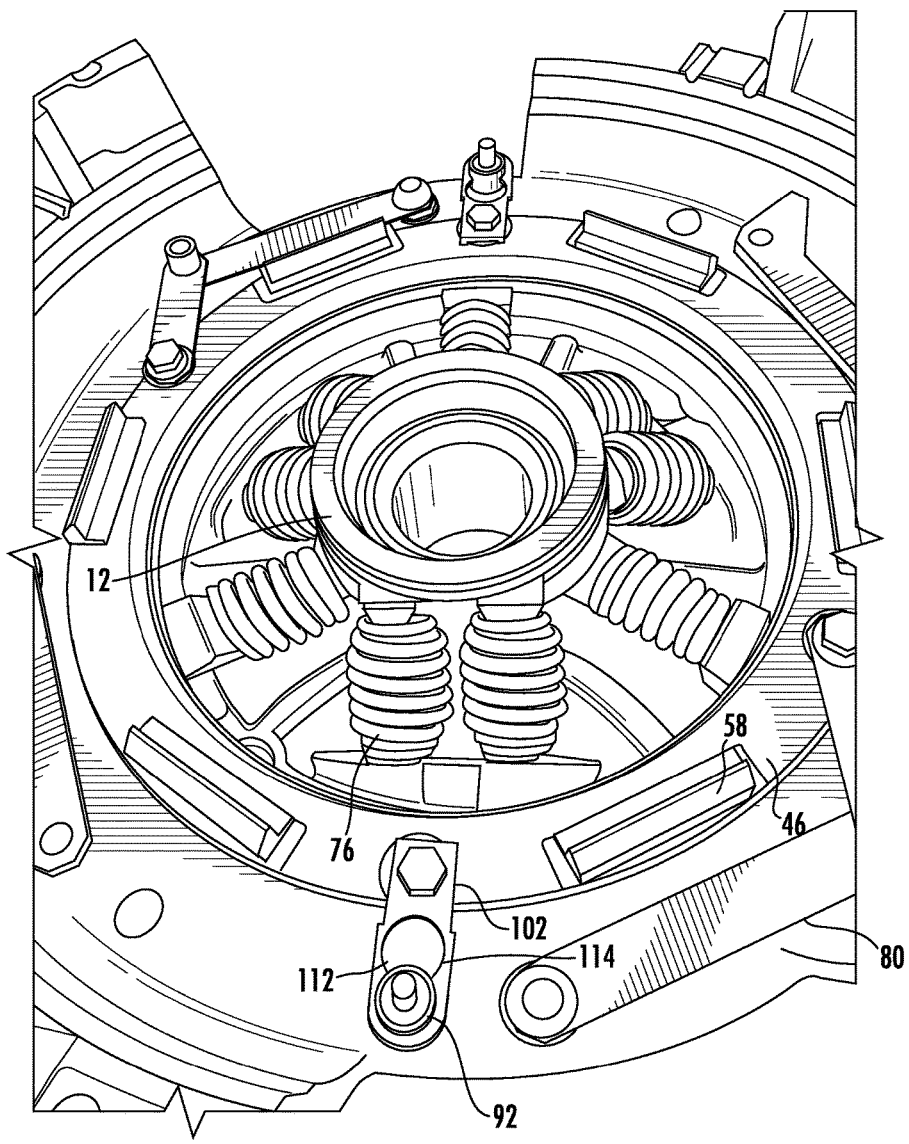
FIG. 7 is a perspective view of a limiting mechanism of the present invention attached to a cover.
Figure 8:
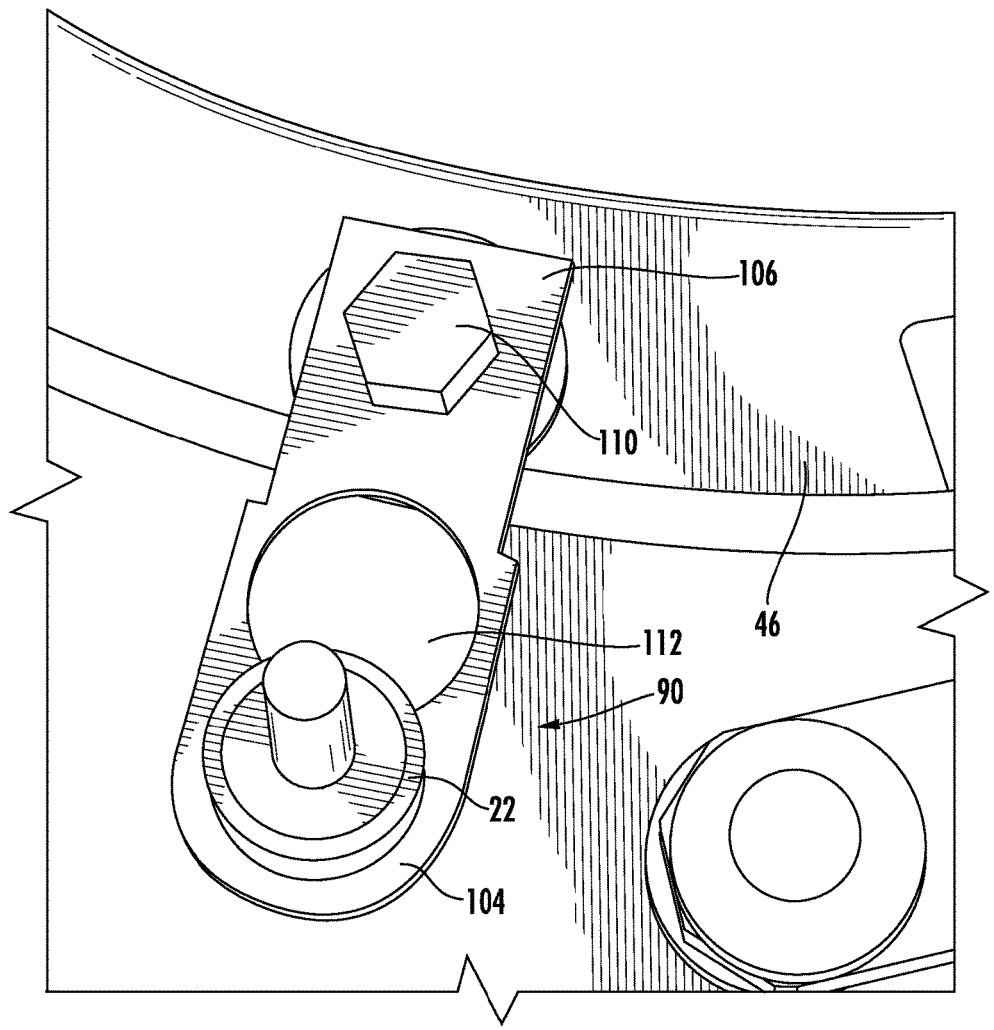
FIG. 8 is an enlarged perspective view of the limiting mechanism of FIG. 7 showing attachment to the cover and an adjusting ring.

Referring to FIGS. 3 and 4, a series of coil springs 76 extend between the cover 30 and the retainer 14 of the release assembly 12 to bias the retainer 14 into an engaged position. As shown in FIGS. 4 and 5, a plurality of levers 70 may be disposed between the cover 30 and the adjusting ring 46 for selectively engaging the clutch. A series of projecting members 58 extend from the bottom surface of the adjusting ring 46 and are sized to be received in corresponding slots 72 proximate the outward ends 74 of the levers 70. Pressure plate 60 may be attached to the cover 30 by a strap and pin connection assembly 80.

Figure 9:
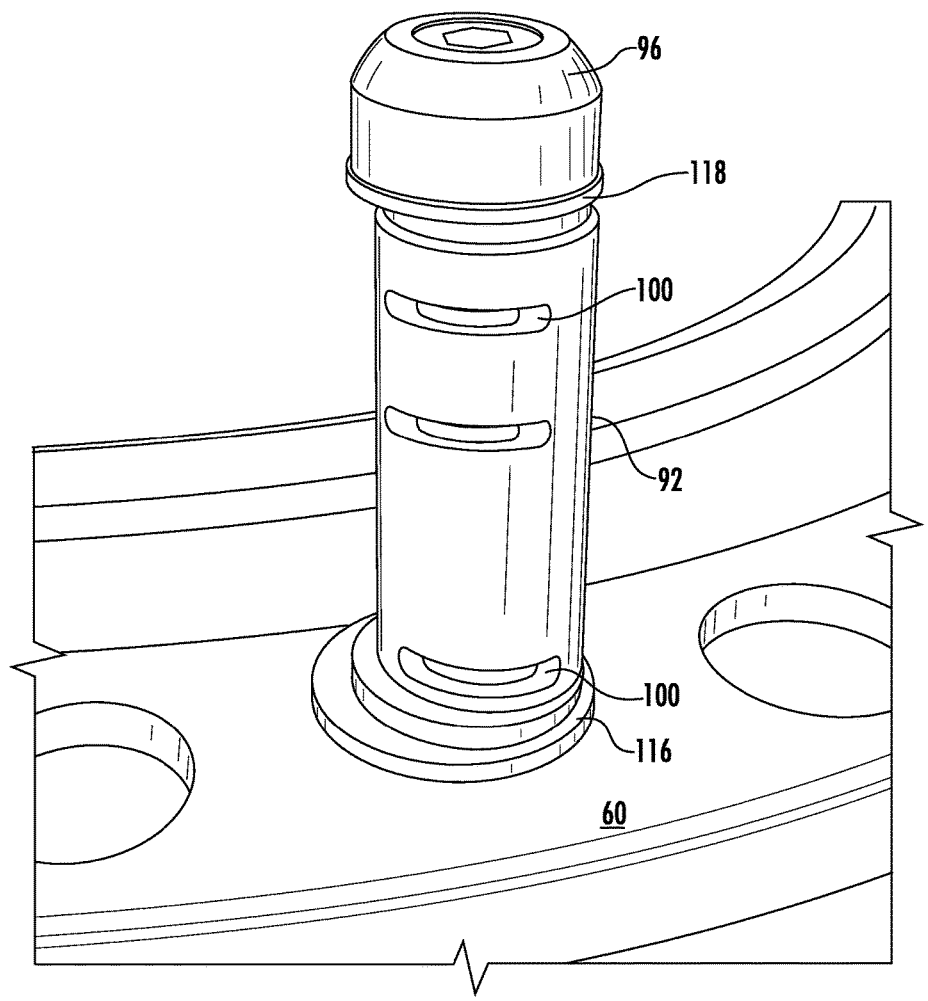
FIG. 9 is a perspective view of a bushing of the limiting mechanism of FIG. 7.
Figure 10:
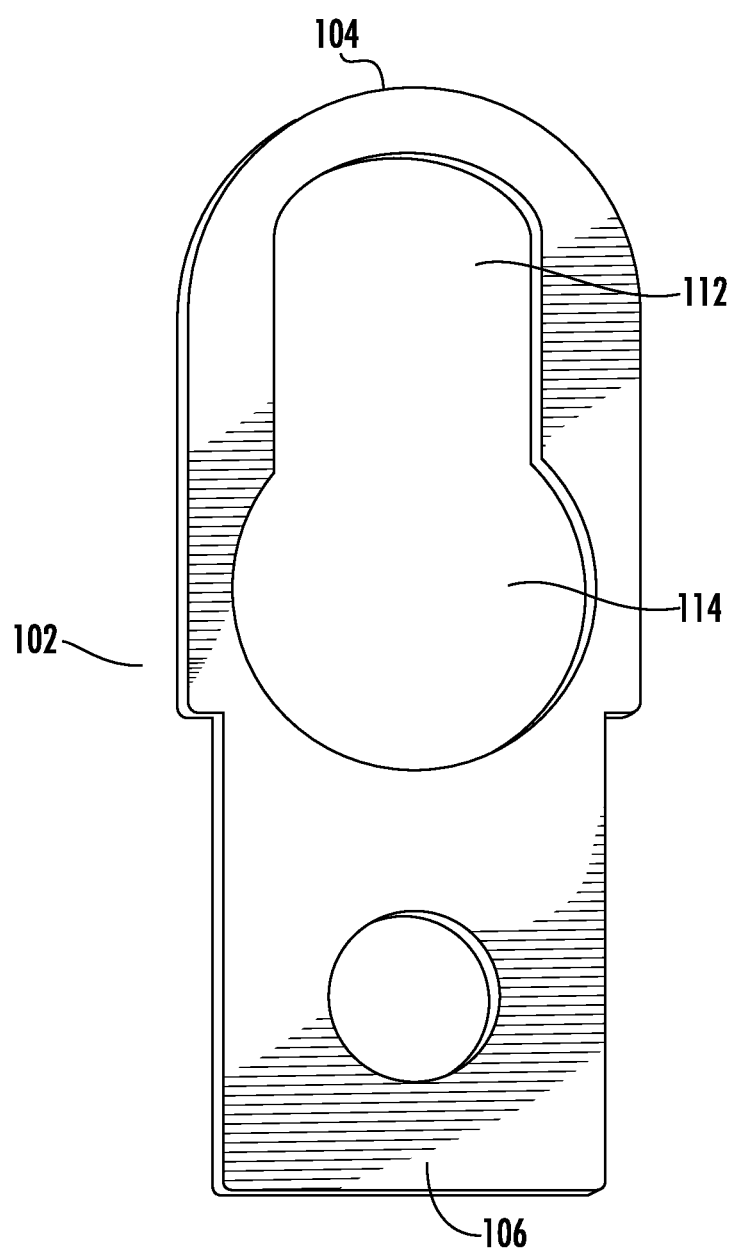
FIG. 10 is a perspective view of a connecting plate of the limiting mechanism of FIG. 7.

Referring to FIGS. 1 through 3, the limiting mechanism 90 connects the cover 30 to the adjustment mechanism 40 using a connector 102 that links fixation members 92, 110 together. In a preferred embodiment, the connector is made from a rigid material such as, but not limited to, steel. One fixation member may be a bushing 92 that is placed through a corresponding hole 34 in the cover 30 of the clutch. A bolt 94 attaches the bushing 22 relative to the pressure plate 60. The head 96 of bolt 94 is sized to extend over the end of the bushing 92 and have a larger diameter then hole 34. Washer 118 may be used between the head 96 of bolt 94 and the bushing 92. The other end 98 of the bolt 94 may be screwed into a corresponding hole 62 on the pressure plate 60. Washer 116 may be used between bushing 92 and pressure plate 60. Accordingly, the bolt 94 acts to limit the relative movement of the pressure plate 60 and cover 30. While two limiting mechanisms 90 are shown in the drawings, it is appreciated more than two limiting mechanisms 90 may be used and not depart from the scope of the invention. Referring to FIG. 9, bushing 92 is sized relative to the distance between the washers 116, 118 to allow a limited amount of axial movement therein.

The bushings 22 include a groove or slot 100 on their lower end that is sized for receiving one end 104 of the strap or connecting member 102. The other end 106 of the strap 104 includes an opening 108 that is sized to allow a second fixation member 110 such as a bolt to extend therethrough to engage corresponding holes 56 on the adjusting ring 46. In order to facilitate the placement of the strap 102 onto the bushing 92, the strap 102 may include an oversized hole or opening 112 that allows the bushing 92 to be placed in a larger portion 114 of the opening 112 and then slid to engage the groove or slot 100. While a keyhole shape is shown in the figures, it is appreciated that it may take the form of other shapes as well. Using the limiting mechanisms 20 to connect the cover 30 to the adjusting ring 46 prevents the cam rings 42, 44 from jumping and over-adjusting when a sudden jolt of shock load is introduced into the clutch assembly 10 (e.g., when the vehicle hits a solid object such as backing into a loading dock). It is appreciated that if the adjustment mechanism does not include an adjusting ring, the strap may be attached to the second cam ring.

It will be understood that modifications and variations may be effected without departing from the spirit and scope of the present invention. It will be appreciated that the present disclosure is intended as an exemplification of the invention and is not intended to limit the invention to the specific embodiment illustrated and described. The disclosure is intended to cover, by the appended claims, all such modifications as fall within the scope of the claims.

The invention claimed is:

1. A limiting assembly for a self-adjusting clutch assembly having a cover, an adjustment mechanism having an adjusting ring and a pair of cam rings having corresponding ramped surfaces thereon and a pressure plate, the limiting assembly comprising:
   at least two limiting mechanisms, each limiting mechanism comprising:
      a bushing that extends through a hole in the clutch cover;
      a first fixation device having a first end and a second end, the first end sized to extend over an end of the bushing and the hole, the first fixation device attaching at the second end to the pressure plate, wherein the bushing is sized for limited axial movement relative to the first fixation device;
      a connector having a first end and a second end, wherein the connector is directly attached to the bushing proximate the second end; and
      a second fixation device attaching the connector to the adjusting ring at the first end;
   wherein the holes in the clutch cover for accepting the bushing are spaced circumferentially apart around the clutch cover.

2. The limiting assembly of claim 1 wherein the first and second fixation devices are bolts.

3. The limiting assembly of claim 1 wherein the connector is a flat oblong member.

4. The limiting assembly of claim 3 wherein the connector is made from a rigid material.

5. The limiting assembly of claim 1 the at least two limiting mechanisms comprises four limiting mechanisms.

6. A limiting assembly for a self-adjusting clutch assembly having a cover, an adjustment mechanism having an adjusting ring and a pair of cam rings having corresponding ramped surfaces thereon and a pressure plate, the limiting assembly comprising:
   at least two limiting mechanisms, each limiting mechanism comprising:
      a bushing that extends through a hole in the clutch cover;
      a first fixation device having a first end and a second end, the first end sized to extend over an end of the bushing and the hole, the first fixation device attaching at the second end to the pressure plate, wherein the bushing is sized for limited axial movement relative to the first fixation device;
      a connector having a first end and a second end, wherein the connector is attached to the bushing proximate the second end and wherein the connector includes a hole at the second end sized to allow the bushing to pass therethrough, and the bushing includes a slot for accepting part of the end of the connector about the hole; and
      a second fixation device attaching the connector to the adjusting ring at the first end;
   wherein the holes in the clutch cover for accepting the bushing are spaced circumferentially apart around the clutch cover.

7. The limiting assembly of claim 6 wherein the hole includes a portion having a larger width.

8. The limiting assembly of claim 7 wherein the hole is in the shape of a keyhole.

9. A limiting assembly for a self-adjusting clutch assembly having a cover, an adjustment mechanism having an adjusting ring and a pair of cam rings having corresponding ramped surfaces thereon and a pressure plate, the limiting assembly comprising:
   at least two limiting mechanisms, each limiting mechanism comprising:
      a bushing that extends through a hole in the clutch cover, the bushings each having a slot formed thereon;
      a first fixation device having a first end and a second end, the first end sized to extend over an end one of the bushings and corresponding hole, the first fixation device attaching at the second end to the pressure plate, wherein the bushing is sized for limited axial movement relative to the first fixation device;
      a connector made from a rigid material having a first end and a second end, the first end having a first hole and the second end having a hole at the second end sized to allow the bushing to pass therethrough, wherein the slot is sized to receive part of the second end of the connector about the hole;
      a second fixation device having an enlarged end and sized to extend through the hole at the first end for attaching the connector to the adjusting ring;
   wherein the holes in the clutch cover for accepting the bushing are spaced circumferentially around the clutch cover.

10. The limiting assembly of claim 9 wherein the first and second fixation devices are bolts.

11. The limiting assembly of claim 10 wherein the connector is a flat oblong member.

12. The limiting assembly of claim 10 the at least two limiting mechanisms comprises four limiting mechanisms.

* * * * *